Oct. 26, 1943.                L. J. KOCI                2,332,518
                              THERMOSTAT
                        Filed April 1, 1940            5 Sheets-Sheet 1
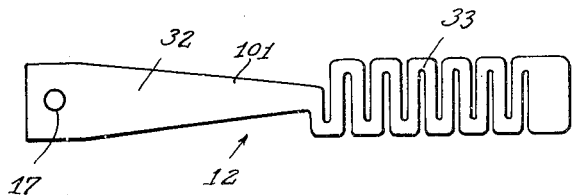
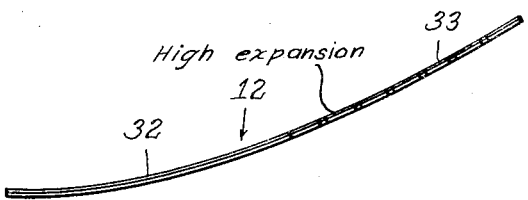
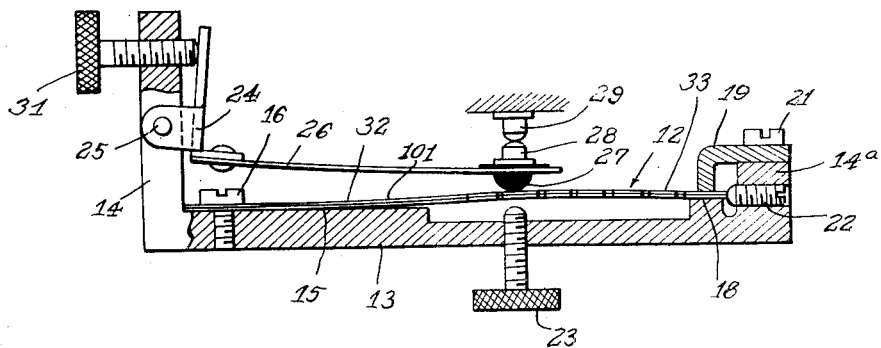
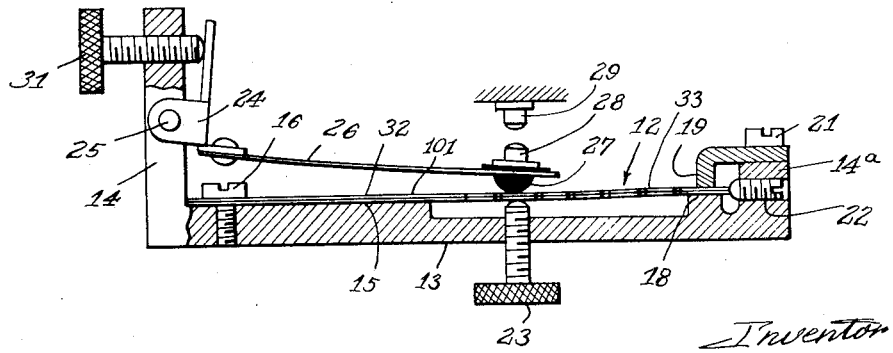
Inventor:
Ludvik J. Koci
By McCanna, Wintercorn & Morsbach
Attys.

Oct. 26, 1943.  L. J. KOCI  2,332,518
THERMOSTAT
Filed April 1, 1940   5 Sheets-Sheet 2
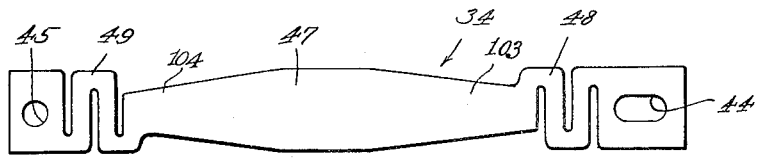
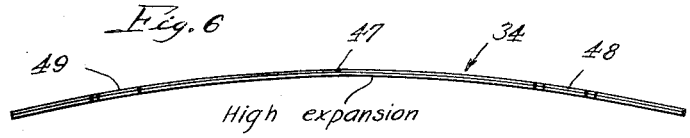
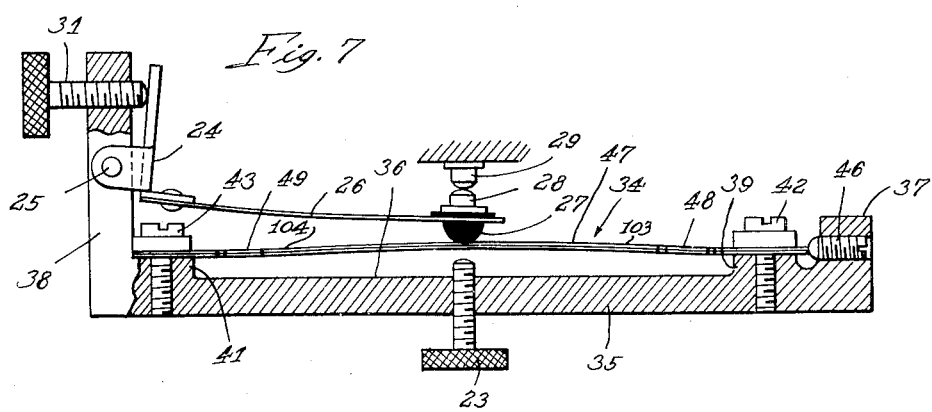
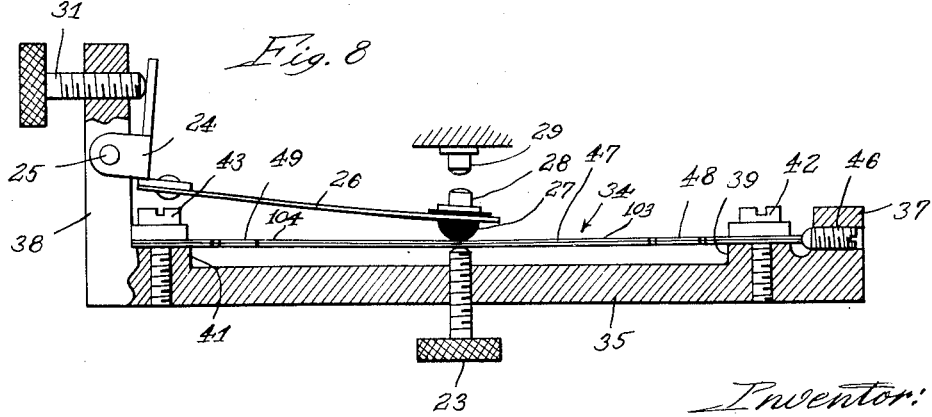

Oct. 26, 1943.  L. J. KOCI  2,332,518
THERMOSTAT
Filed April 1, 1940   5 Sheets-Sheet 3
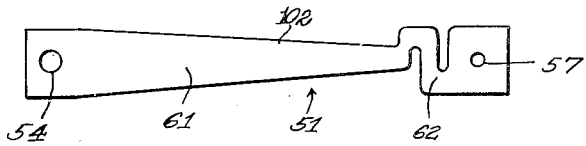
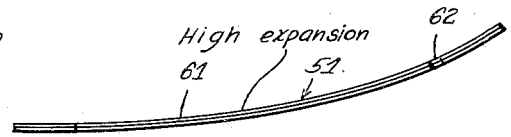
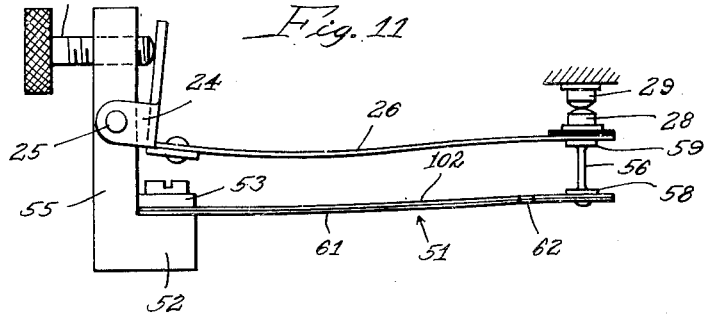
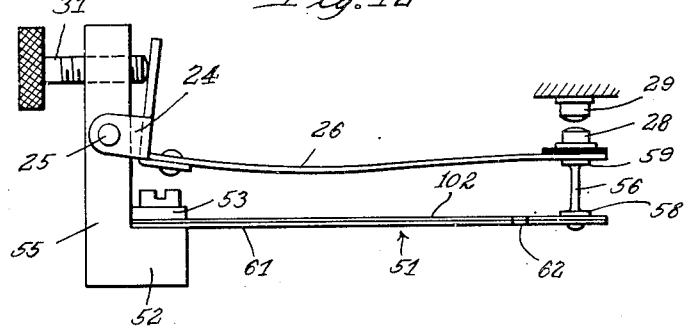

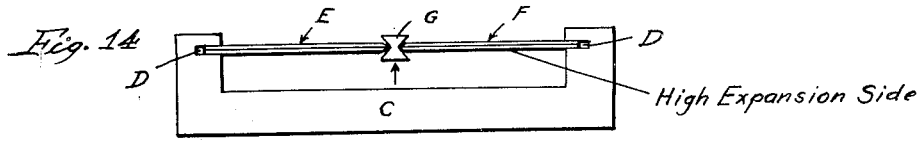
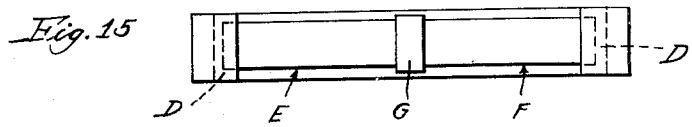
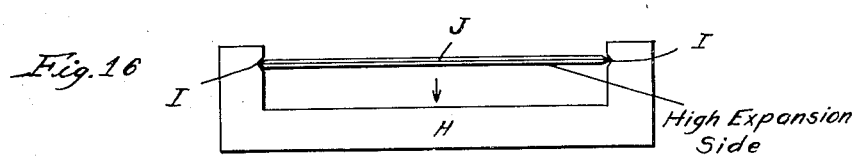
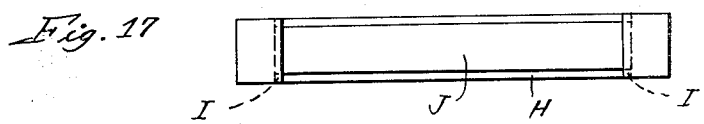
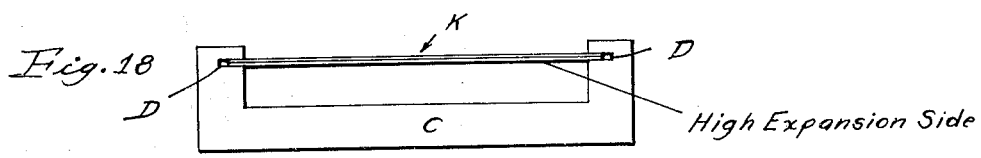
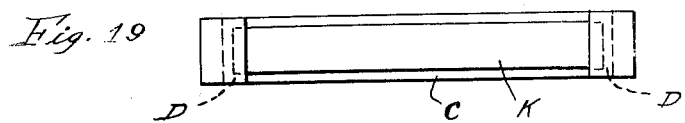
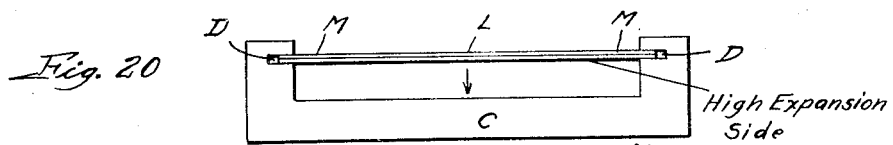
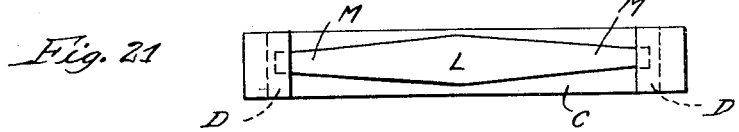
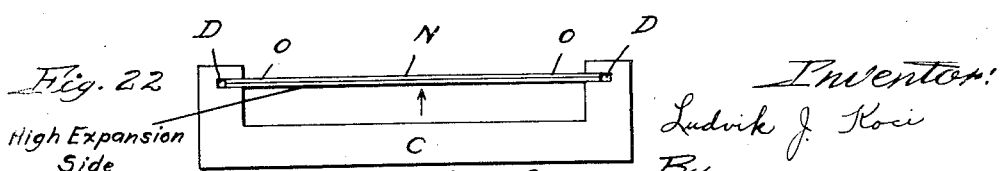
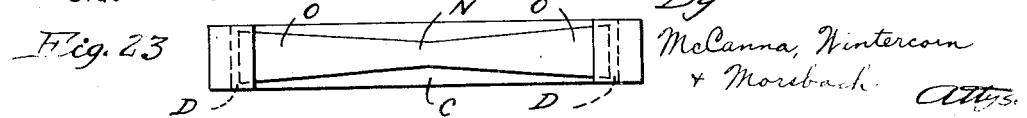

Patented Oct. 26, 1943

2,332,518

UNITED STATES PATENT OFFICE 2,332,518

THERMOSTAT

Ludvik J. Koci, Chicago, Ill., assignor to Chicago Flexible Shaft Company, Chicago, Ill., a corporation of Illinois Application April 1, 1940, Serial No. 327,255

30 Claims. (Cl. 297—15)

This invention relates to compensating thermostats.

One of the important objects of the invention is the provision of an improved thermostat which is self-compensating for temperature lag due to its own mass or due to some adjacent body, or to parts of the thermostat other than the temperature responsive elements.

Another important object is the provision of an improved thermostatic device adapted for compensating for the effect of change of temperature of a support or ambient atmosphere while mainly responsive to another temperature such as, for example, the temperature of a gas or other medium distinct from that of said support or ambient temperature. In this connection my invention contemplates a device which enables any desired degree of compensation for the effects of the temperature change associated with any such support or ambient atmosphere.

A further object of the invention is to provide a thermostat having the above described characteristics all embodied in a simple form comprising a substantially straight, non-reversed, and non-reentrant strip of thermostatic material.

A further object is to provide an improved thermostat of greater practicability and wider range of application because of the relatively small and compact space required for the thermostatic strip.

A further object is to provide an improved thermostat of greater efficiency, in that it possesses an inherent characteristic resulting in maximum thermostatic action for a given strip and given temperature difference existing between the main and compensating portions of the strip, and of greater accuracy due to a further important characteristic in that the portion exhibiting maximum compensating action is located at a position most remote from that portion exhibiting the maximum main thermostatic action. According to my invention the described thermostatic actions occur free of all friction (disregarding the infinitesimal amount of friction associated with intermolecular motion) which contributes in a further important measure toward assuring improved accuracy and reliability of the device.

A further object of the invention is the provision of a thermostat structure such that it may be manufactured in quantities with greater uniformity between the thermostats so produced.

A still further object of the invention is the provision of a thermostat structure wherein adjustment of the operating characteristics of the device may be made with facility and simplicity.

Another object is the provision of a snap acting thermostat structure embodying compensating characteristics of the kind described which may be mounted in good thermal contact with a solid object, the temperature of which is to be controlled.

A still further object of the invention is the provision of a snap acting thermostat in which temperature compensation is provided directly in the thermally responsive element.

I have also aimed to provide a thermostat structure adapted for use in electrical appliances and devices such as sadirons, toasters, waffle irons, coffee makers and the like wherein the temperature compensation for lag in heat transmission in the thermostatic metal and in other parts of the device is accomplished directly in the thermostat without resort to secondary temperature responsive or heating devices such as now commonly used whereby to eliminate such secondary devices together with their associated parts and pivotal connections which lead to expense in manufacture and operating difficulties in service.

Specifically, my invention contemplates a structure depending on the novel principle that if one portion of a generally straight strip of unreversed bimetallic material (of any local shape and variation in section modulus) is rigidly fastened or restrained against both angular and translational motion and a second portion of the strip at a point longitudinally removed from said first mentioned portion is subject to action including a reactive couple or moment acting to restrain angular motion of said second portion but permitting minimum restraint to translational motion of said second portion in a direction normal to the general length of the strip, then said second portion will exhibit a thermostatic action in the line of said direction but directed in one way or the opposite depending on whether said second portion or the portion immediately adjacent to said rigidly fastened portion, is heated. And my invention in some embodiments also contemplates the additional novel principle that the relative magnitude of the two opposite thermostatic actions above described can be varied by variation of the effective section modulus of the strip or by any other means which may serve to alter the degree of restraint to angular motion of said second portion.

Other objects and advantages will appear from the following description and the accompanying drawings, in which—

Figure 1 is a face view of a thermostatic strip embodying one form of my invention;

Fig. 2 is an edge view thereof at normal atmospheric temperature;

Fig. 3 is a side elevation partly in section showing the strip as embodied in a complete thermostat structure showing the contacts at closed position;

Fig. 4 is a view similar to Fig. 3 showing the contact in open position, the positions and shapes of the parts being somewhat exaggerated in Figs. 3 and 4 for the purpose of illustrating the invention;

Figs. 5 and 6 are face and edge views of a thermostatic strip showing a second embodiment of the invention.

Fig. 7 is a side elevation partly in section showing the manner in which the strip of Figs. 5 and 6 is embodied in a complete thermostat structure, showing the contacts in closed position;

Fig. 8 is a view similar to Fig. 7 showing the contacts in open position, the position of the parts being somewhat exaggerated;

Figs. 9 and 10 are face and edge views of a thermostatic strip showing a further embodiment of the invention, the shape of the strip being that at atmospheric temperature;

Figs. 11 and 12 are side elevations of a completed thermostatic structure embodying the strip shown in Figs. 9 and 10, the parts being shown in closed contact and the open contact positions, the parts being somewhat exaggerated to illustrate the invention;

Figure 24:
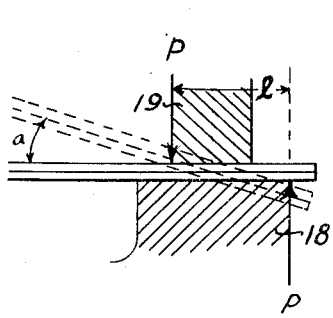
Figure 25:
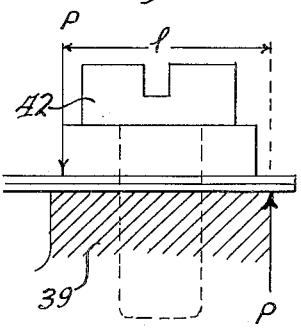
Figure 26:
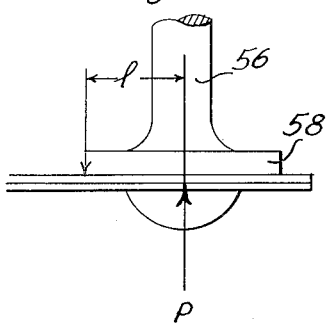

Figs. 14 to 23, inclusive, are explanatory views showing what is believed to be the principle of operation of this invention; and Figs. 24, 25 and 26, are diagrammatic drawings illustrating the reactive couple.

For the purpose of setting forth, at the outset, a further explanation of the principles on which the various embodiments of the invention are based, attention is first directed to Figs. 14 through 23 which are diagrammatic, to better show the principles involved.

Referring first to Figs. 14 and 15 in which the letter C designates a frame structure having upstanding ends provided with coplanar slots D within which one end of bimetallic strips E and F are positioned so as to be free to have longitudinal movement but restrained against angular movement under temperature changes, and the letter G designates a pivotal connection between the strips E and F, a uniform rise in temperature of the strips would be accompanied by an upward movement of the center portion of the composite thermostat as indicated by the arrow. Wherever I refer to uniform change in temperature, whether such change be a rise or fall with respect to an existing temperature condition, I mean the application of an identical change in temperature to all parts of the thermostatic strip. This explanation is offered to eliminate the possibility of confusion with the condition of a temperature gradient along the length of the strip. In Figs. 16 and 17 a frame H is provided with pivotal bearing notches I in uprights disposed at the ends thereof and a bimetallic strip J is provided with knife edge bearings at its ends seated in the notches I. Theoretically a uniform rise in temperature of the bimetallic strip shown in these figures would result in a movement of the middle portion of the strip in a downward direction as indicated by the arrow, which direction is directly opposite to that produced by the structure shown in Figs. 14 and 15. These two effects I have designated as being the A and B effects, respectively. On the other hand, if a structure is formed in accordance with Figs. 18 and 19 wherein the bimetallic strip K is of uniform width and thickness throughout its length, and the frame C is formed in accordance with the frame C of Figs. 14 and 15, the ends of the strip being positioned in the slots D so as to prevent angular movement thereof, a uniform change in temperature of the strip K throughout its length will produce no lateral movement of the strip for the reason that the A and B effects are equal and the tendency of the middle portion of the strip to move downward is exactly balanced by the tendency of the end portions to move the middle portion upward. Such a strip of uniform width and thickness will deflect only when there exists a temperature gradient between the middle portion and the end portions. It will be seen that if one of these effects can be caused to predominate, the balance will be disturbed and a net movement in one direction or the other with uniform change in temperature of the strip, can be produced. For example, if the center of the strip is made wider than the end portions as shown in Figs. 20 and 21, the B effect will predominate and there will be a net movement downward at the center of the blade upon a uniform rise in temperature due to the fact that the center portion L is of greater width than the end portions M. Furthermore, this downward movement of the center portion will be greatly less than the movement resulting from the structure of Figs. 16 and 17 because the downward movement of the center portion is in part counteracted by the tendency of the end portions M to move the center portion upwardly. The reduction in restraint resulting from simply narrowing the ends of the strip is ordinarily not sufficient for many practical applications of a thermostatic structure, but further reduction and restraint can be obtained in numerous other ways, such, for example, as employing a serpentine configuration at the ends of the strip as shown in Fig. 5, thus causing the B effect to greatly predominate over the A effect. On the other hand, by narrowing the center of the strip as shown in Figs. 22 and 23 to cause the center portion N to be of greater flexibility than the end portions O, the A effect can be caused to predominate and a uniform rise in temperature will cause an upward movement of the center of the strip analogous to that of Figs. 14 and 15. Thus it will be seen that with the structures of Figs. 20 through 23, for example, at all temperatures the A effect of Figs. 14 and 15 and the B effect of Figs. 16 and 17 are simultaneously occurring, and that if at any temperature existing at the widest portion, the temperature of the ends of the strip is different from that of the center, the center of the strip will occupy a position different than would be the case if the strip were uniformly heated. The amount of this correction can be varied by varying the relative flexibilities of the two portions of the strip, and this effect can be employed in controlling a heated device to compensate for lag and the change in temperature inherent in the strip and also for temperature lag in the elements conducting heat to that portion of the strip having the predominate thermostat effect.

Directing attention first to the form shown in Figs. 1 to 4, inclusive, the numeral 12 designates a bimetallic strip having substantially the shape characteristics shown in Figs. 1 and 2 at atmospheric temperature, the upper side being the high expansion side of the strip. As will be seen from Fig. 2, the strip is curved along its length when cold with its high expansion side innermost. The strip is in this instance mounted in a frame as shown in Figs. 3 and 4, but it will be understood that the frame will in many instances consist of a part of a device, the temperature of which is to be controlled or to which the strip is to be mainly responsive. The frame comprises a base plate 13 and uprights 14 and 14a, the base plate having a surface 15 which in this instance is the surface to which the strip is primarily temperature responsive. The strip 12 is fixedly attached to the surface 15 in face contact therewith by a large headed screw 16 passing through an opening 17 in one end of the strip. The opposite end of the strip is confined against lateral and angular movement by spaced abutments 18 and 19, the former being provided on the frame 13 and the latter comprising a bracket secured to the end member 14a by means of a screw 21, the abutments bearing against opposite sides of the strip in spaced relation to its end and being of sufficient width as to substantially prevent angular movement of the strip. The strip is stressed by a screw 22 seated in the end portion 14a and bearing against the end of the strip, the screw being arranged to move longitudinally of the strip to apply a longitudinal force thereto. A screw 23 is seated in the frame portion 13 arranged for adjustment to act as a stop to limit the downward movement of the strip intermediate its ends, in this instance adjacent the midpoint.

The end portion 14 has a lever 24 pivoted at 25, the lever carrying a leaf spring 26 extending forwardly along the strip 12 and carrying an insulation button 27 adapted to contact the strip and a movable contact 28, positioned to engage a stationary contact 29 to control a circuit (not shown) for exercising control in response to the temperature of the frame 13. A thumb screw 31 in the end portion 14 permits of adjustment of the position of the lever 24 and the spring 26 whereby to apply more or less lateral pressure on the strip and thus change the temperature at which the strip will act to flex the spring 26 and move the contact 28 into or out of engagement with the contact 29. The stationary contact 29 also acts as a stop to limit the upward movement of the strip.

The strip 12 may be more or less arbitrarily considered as comprising two integral portions 32 and 33 stamped from a single piece of bimetallic material, the portion 32 tapering inwardly toward the center of the strip, and the portion 33 having a serpentine configuration as will be apparent from Figure 1. It will be seen that the portion 32 has its greatest width and cross-sectional area adjacent its point of attachment to the frame portion 13, and that it tapers inwardly so that its flexibility and mass decrease toward the opposite end thereof at which it joins the portion 33. The purpose of the serpentine configuration of the portion 33 is to increase the flexibility thereof and to thus control the restraint to angular movement imposed on the area at the narrow end of the portion 32. That is, the serpentine configuration serves to reduce the effective section modulus or restraint to bending action to a point not readily achieved by simply reducing the width or thickness of the strip. This restraint is further brought about by the manner in which the ends of the strip are secured against angular movement by the screw 16 and by the abutments 18 and 19. The manner in which this restraint is imposed and its effect will presently be described. A further function of the serpentine configuration is to lend resiliency to the strip so that when longitudinal stress is imparted to the strip by the screw 22, an elastically soft snap-acting characteristic is imparted to the strip, the degree of softness of this characteristic and range of snap acting motion of the strip at the point opposite the button 27 depending upon the longitudinal resiliency or softness in the portion 33.

In Figs. 5 to 8, inclusive, I have shown an embodiment of the invention which is particularly adapted for use where the thermostat is intended to be responsive to the temperature of any fluid medium, or in cases where heat transfer between the medium controlled and the thermostat is chiefly accomplished by the mechanism of radiation. On the other hand, the embodiment shown in Figs. 1 to 4 is in general better adapted for use where the thermostat is intended to be primarily responsive to the temperature of a solid surface, such, for example, as the surface 15 because of the better thermal contact between the strip and the surface. In this form of the invention the strip takes the shape shown in Figs. 5 and 6 and indicated generally by the numeral 34, and is supported in a frame structure similar to that of Figs. 3 and 4, in this instance comprising a central portion 35 having a recess 36 and end portions 37 and 38 having supporting abutments 39 and 41, against the upper surface of which are secured the ends of the strip 34 by means of large headed screws 42 and 43, the screws passing through openings 44 and 45, respectively, for the purpose of securing the ends of the strip against the abutments 39 and 41 and to prevent relative angular movement of the ends of the strip. Stress is applied to the end of the strip in a longitudinal direction by means of a screw 46 seated in the end portion 37. This stress if applied in only slight amount results in a desirable softness and increased range of motion of the middle portion of the strip in a direction normal to its length, or if applied in a sufficiently greater degree it will result in causing snap acting motion of this middle portion. In each of Figs. 5 to 8, inclusive, the lower side of the bimetallic strip is the high expansion side. The spring 26, the lever 24, pivot 25, screw 31, button 27, contacts 28 and 29, and stop screw 23 are likewise provided in this form as in the form shown in Figs. 3 and 4 and serve identical functions. In this form of the invention it will be seen that the strip 34 has a central portion 47 which converges inwardly toward its end and end portions 48 and 49, each of which are serpentine in configuration, thus producing an area at each end of the portion 47 which is of greater flexibility than the central portion whereby the ends of the portion 47 are restrained against angular movement with respect to the plane of the abutments 39 and 41, the degree of this restraint being dependent upon the flexibility of the portions 48 and 49. Although Figs. 5-3 show a form in which the end portions of the strip have a serpentine configuration which has a characteristic high degree of bending flexibility and thus imposes relatively small angular restraint, this would be suitable only where a small degree of secondary or compensating action is desired. Other forms for the same general application may have the ends distinguished from the middle portion only by a narrower width (somewhat similar to Fig. 21) thus providing a greater degree of compensating or secondary action. Still other forms may use a strip of hardly discernible variation in width between the middle portion and the end portions of the strip, or even of uniform width (similar to Fig. 19), in order to provide a still greater degree of secondary or compensating action than that of either Fig. 5 or 20.

In the form of the invention shown in Figs. 9 to 12, the thermostat is a so-called slow-acting thermostat, as distinguished from a snap-acting thermostat in the two forms heretofore described (Figs. 1-4 and Figs. 5-8), due to the omission of means for longitudinally stressing the ply metal thermostatic strip. In this form of the invention the thermostatic blade designated generally by the numeral 51 is attached to the base portion 52 of a frame by means of a large headed screw 53 which passes through opening 54 in the strip, the large head acting to firmly seat the end of the strip against the base. The base carries an upright 55 similar to the end portions 14 and 38 of Figs. 3 and 4 and Figs. 7 and 8 which carries the lever 24, pivot 25, spring 26, adjusting screw 31, and contacts 28 and 29, which parts serve the same function as in previous forms. The shape characteristics of the ply metal strip are shown in Figs. 9 and 10, the upper side of the strip shown in Fig. 10 being the high expansion side and the strip being supported in Figs. 11 and 12 with the high expansion side upward. The spring 26 and the strip 51 are fixedly secured together by means of a pin 56 which is firmly and rigidly anchored at one end through an opening 57 in the free end of the strip. The opposite end of the pin is firmly and rigidly anchored to the free end of the spring 26. In this instance the opposite ends of the pin 56 are provided with flanges 58 and 59 which seat against the flat faces of the strip 51 and the spring 26, respectively, to better secure these parts in the desired relationship. The pin 56 and its connections are such as to allow for free longitudinal movement of the pin 56 by flexing of the strip 51 and the spring 26, but to prevent appreciable tilting or angular movement of the pin 56 whereby to hold the end portion of the strip against angular movement or, in other words, to restrain angular movement of the free end of the strip. The contact point 28 is usually electrically insulated from the supporting structure.

By reference to Fig. 9 it will be seen that the strip 51 has a main portion 61 which tapers inwardly toward its free end and terminates in a serpentine portion 62 at the opposite end of the strip, the serpentine portion providing greater flexibility to this end of the strip. As in the case of Figs. 5-8, other applications using the same structure may omit the serpentine portion and retain only the narrowing width toward the free end to obtain a greater degree of compensating action. In still other instances a thermostatic strip of hardly discernible variation in width or even of no variation in width may be used to obtain a still greater degree of compensating action.

I have also provided a method for manufacturing thermostats whereby lag due to the mass of the thermostatic strip or of the structure to which the strip is attached may be compensated for directly in the temperature responsive element. Bimetallic thermostats and the like, when used as temperature controls, normally possess inherent mass effect which results in a lagging response of the thermostat to temperature change. This effect is due to the fact that time is required to conduct the heat from the material to which the device is to be responsive through the thermostatic strip. In the case of solids, the strip moves away from the object at the beginning of the temperature change, and consequently the heat must be conducted through the point of attachment. On the other hand, with a fluid medium, while a portion of the strip may be in good heat transfer relationship thereto, yet the strip must be supported on some solid object which may change temperature at a different rate. Furthermore, due to practical difficulties, thermostats must frequently be mounted in a position more or less remote from the point at which constant temperature is desired, thus introducing lag which is additional to that occasioned by the mass of the thermostatic metal itself. In the past, the mass has been compensated for in a rather crude way by the use of a secondary thermostat acting in a direction opposite to that of the main thermostat, the location and mass thereof being balanced as well as possible to introduce a lag in its response sufficient to compensate for the lag inherent in the main thermostat. However, I have found that both the primary and the compensating thermostatic actions can be incorporated in a single piece of substantially straight thermostatic metal and highly improved compensating action attained under all conditions of use.

The method will be best understood from a comparison of the strip shown in Figs. 1 to 4 with that shown in Figs. 5 to 8. Considering first the form shown in Figs. 1 to 4, and omitting consideration of the longitudinal stress applied by the screw 22 for the purpose of producing snap action, if the strip were of uniform cross-section throughout its length, no lateral deflection of the central portion of the strip would occur if every portion of the strip underwent an exactly equal change in temperature. If, on the other hand, a pivotal bearing such as a knife edge bearing, were interposed in the strip adjacent its mid-point, the strip would move downward (demonstrating the A effect, Fig. 14, but now applied as in Figs. 1 to 4 wherein the high expansion side is on top) at the pivot point upon rise in temperature; in other words, away from the high expansion side of the metal. By elastically weakening the portion 33 of the strip we approach a pivotal condition at this point and cause the A effect to predominate in the form Figs. 1 to 4, although the B effect still exists due to even the small amount of elastic restraint to angular motion produced by the supports 18—18 coupled with the relatively weak elastic portion 33, whereas in the form shown in Figs. 5 to 8 presently to be described more in detail, the B effect predominates, although in this latter case there still remains some degree of the A effect.

In Figs. 5 to 8 it will be seen that the weakened portions of the strip, that is, the portions of greatest flexibility, occur adjacent to opposite ends of the strip. If the strip were of uniform cross-section and the ends were supported by knife edge pivots (as in Fig. 16), the central portion of the strip would move in the direction toward the high expansion side of the metal. This I have called the "B" effect. For this reason, it will be seen that in Figs. 5 to 8 the high expansion side of the strip is reversed from that shown in Figs. 1 to 4 in order to cause the contacts 28 and 29 to open upon increase in temperature. In this structure the serpentine portions 48 and 49 give greater flexibility at the ends of the strip and offer less resistance than other parts of the strip to the bending thereof under temperature change and therefore produce in effect a pivotal condition upon which is superimposed a slight amount of elastically yielding restraint.

I have found that by imposing various conditions of restraint upon movement of the strip which are intermediate between a pivotal connection and that offered by a strip of full width, either the "A" or the "B" effect can be made to predominate and in varying degrees, depending upon the degree of restraint, and thus a compensating action can be simply derived since by so doing the two necessary requirements for compensating for the effect of lag can be fulfilled, namely, (1) a secondary thermostatic action opposite in effect to the main or controlling thermostatic action, and (2) lagging response of the secondary thermostatic action relative to the main thermostatic action of a degree properly proportioned to the natural thermal lag for which compensation is desired. In the construction shown in Figs. 1 to 4 it will be apparent that there will be a lagging thermal response of the serpentine end of the strip relative to the thermal response of the fixed end upon change in temperature of the base 13, whereas with the construction shown in Fig. 5 it will also be apparent that the serpentine portions adjacent to the ends of the strip will lag in thermal response relative to the central portion upon change in temperature of the surrounding gas passing over the thermostat or upon absorption of radiant heat incident on the strip and associated structure. Thus, if instead of a thermostat of uniform width, a thermostatic strip is used in which the strip tapers from its mid-point toward its ends, and the ends are held against angular movement, the "B" effect will be slightly greater than the "A" effect, and there will consequently be a movement toward the high expansion side of the blade upon rise in temperature. However, the reduction of restraint obtained by narrowing the ends of the strip is insufficient for many applications, though this will depend upon the use of the thermostat and the degree of temperature compensation required. In many instances a serpentine configuration such as shown at 33 or at 48 and 49 will bring the desired flexibility in these portions of the strip, the amount of this flexibility being regulated to bring the restraint to the desired value. These configurations also possess the so-called softness with respect to lateral deflection which is necessary for dependable lateral snap-acting operation without external resilient means. Furthermore, since this resilience is a part of the thermostat itself, it is free from the frictional factors which occur in pivotal connections such as are commonly employed to couple the strip to the resilient means in this type of snap-acting mechanism. By adjusting the positions of the screws acting against the ends of the strips, the required degree of temperature differential between the snap in opposite directions is obtained.

In the form shown in Figs. 1 through 4 and that shown in Figs. 9 through 12, I have shown thermostatic structures in which the "A" effect predominates. The action can be explained with greater facility in connection with the form shown in Figs. 9 through 12 which shows a slow acting thermostat in which the movement of the strip is progressive. In this structure if the strip 51 is heated rapidly adjacent to the support 52 only, so that the remainder of the strip remains cool, forces are developed in the strip which reduce the pressure of the contact 28 against the contact 29 or move the contact away. In other words, the outer end of the strip tends to move down. On the other hand, if the strip is heated rapidly near the opposite end adjacent to the portion 62, the contact is moved upwardly, that is, in the opposite direction from its previous movement. Therefore, heating of the strip at opposite ends causes the contact and the movable end of the strip to move in opposite directions. In other words, the net movement of the end of the strip, that is, the movement which is equal to the vector sum of the two opposite thermostatic movements above described, is the result of the forces tending to cause these two movements. Thus, if the strip is of uniform cross-section and shape throughout its length, these forces are equal when the strip is heated uniformly throughout its length and there is no net deflection of the contact. By reducing the cross-section of the strip adjacent to the movable end (as shown in Fig. 9) the force tending to move the movable end upward is reduced below the force tending to move the end downward, and consequently a net movement of the end of the strip downward is produced when the strip is unformly heated. In this way the forces tending to move the contact upward can be reduced to a point at which they exactly compensate for the difference in temperature between the two ends of the strip producing a contact movement similar to that which would be produced if all portions of the strip could be maintained at the same temperature at all times during its operation.

These results are in practice accomplished by fixing one area of the strip and introducing a couple reacting on a spaced area restraining the free angular movement thereof. The essential restrained area is that portion of the strip indicated at the region 101 as well as that portion in contact with the button 27 in Figs. 1 to 4, the area 102 and 62 of Figs. 9 to 12, and the areas 103 and 104 as well as the portion in contact with the button 27 of Fig. 5. These restrained portions are, of course, areas as distinguished from points and the exact extent and location of the areas cannot be precisely defined and may vary within wide limits and still produce the desired function. The influence of this reactive couple is, of course, distributed along the entire strip and thus modifies the action of the strip to produce the desired compensation effect.

For the sake of convenience and cheapness and to produce uniformity in the manufactured product, the portions 33, 62, 48, and 49 are formed from the same piece of metal as the strips and are therefore bimetallic and thermostatic in action. They thus serve to augment the action of the areas 101, 102, 103, and 104, but such action is in addition to the essential restraint and is incidental to this particular mode of construction, for, if desired, these flexible portions could be made of spring metal or other material which would have the required flexibility and would impart the required restraint to angular movement of the ends of the strip portions 32, 47 and 61. Thus it is desirable, though not essential, to make the serpentine portions from the same piece of thermostatic metal.

It will be seen from Figs. 1 to 4, for example, that since the fixed end of the strip through which heat is applied thereto is located at the hottest point and the restrained end of the strip, that is, the portion 101, is located at the coolest point of the strip, these two areas each exercise a compensating effect upon the other. By tapering the portion 32 and allowing limited restrained angular movement in the portion 101, the thermostatic effect resulting from heat applied to the fixed end of the portion 32 is made to predominate over the effect produced by heating of the area 101. Consequently that effect produced by the area 101 is referred to as the compensating effect and is less and opposite in direction from the effect produced by the main body of the portion 32.

Thus, by preventing angular movement of the movable end of the strip and controlling the relative flexibility of the two ends of the strip, so as to restrain angular movement of an intermediate portion, these two forces can be proportioned as desired to produce compensation for differences in the temperature of the two portions of the strip and also between the strip and other portions of a heating appliance designed to be controlled thereby. This is important for the reason that in most cases the thermostat cannot be placed so as to be directly responsive to the part of the device the temperature of which must be controlled thereby and there will consequently normally be a certain lag.

Figure 13:
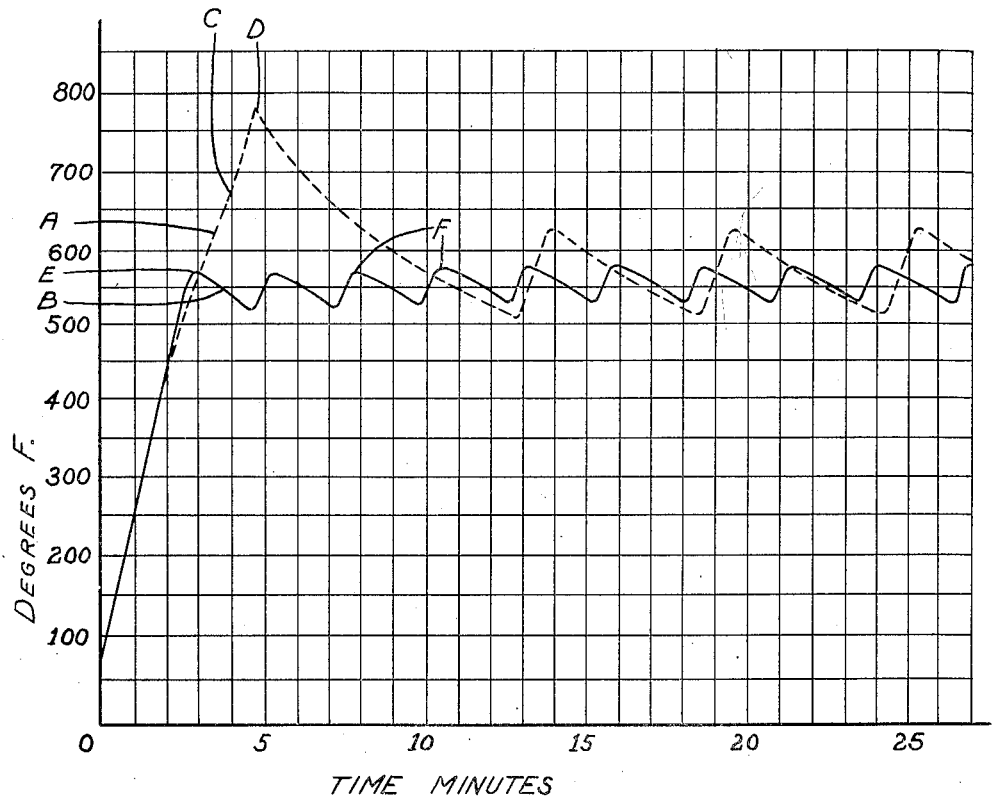
Fig. 13 is a graphical representation showing the change of temperature with time in a heated device having a thermostat characteristic of the prior art and a thermostat structure such as shown in Figs. 1 to 4.

The effective way in which my device acts to compensate for temperature lag is shown in Fig. 13, wherein the line "A" shows the relationship between time and temperature in a well known make of thermostatic controlled electrical device and wherein the line "B" shows the same relation in a similar device controlled by a thermostat made substantially in accordance with Figs. 1 to 4, inclusive. In each case the device was connected to a source of electrical current and the change in temperature with time noted. Attention is directed to the overshoot in temperature indicated at "C," line "A," prior to first opening of the circuit by the thermostat indicated at "D" due to temperature lag in the thermostat mechanism. This overshoot shows a failure of proper temperature compensation. On the other hand, it will be noted that curve "B" shows a total lack of such overshoot, the first opening of the current, as indicated at "E" occurring at substantially the same temperature as subsequent openings indicated at "F." This clearly shows that the thermostat is self compensating to a high degree since the mechanism contains no temperature responsive element aside from the strip 12.

The form shown in Figs. 1-4 may be looked upon as similar to that of Figs. 9-12 with such alteration as required to produce snap action, wherein the serpentine portion 62 of Fig. 9 is extended as shown at 33 in Fig. 1 to a degree sufficient to give the flexibility required for snap action, and wherein the spaced abutments 18 and 19 of Fig. 3 serve to prevent angular movement of the end of the strip in a manner analogous to the pin 56 and spring 26 of Fig. 11, the form shown in Figs. 1-4 having in addition the screw 22 for stressing the strip to produce snap action.

In the form shown in Figs. 5-8, inclusive, the same type of action occurs. In this form the end portions of the strip including the serpentine parts 48 and 49 and the tapered end portions of the portion 47 upon change of temperature tend to move the central portion in a direction opposite to the forces generated by the central portion upon change of temperature in the same direction.

The thermostatic structures herein shown are made adjustable in their temperature response by means of the spring 26, lever 24, and adjusting screw 31, and by this means more or less lateral spring pressure can be applied to the strip by adjustment of the position of the screw 31 so as to vary the temperatures at which the strip will snap between its positions.

The form shown in Figs. 9 to 12 is an embodiment of the principles of the invention into a slow acting thermostat wherein the pin 56 and the spring serve to inhibit angular movement of the free end of the strip as previously described to produce a structure in which the "A" effect predominates.

It will thus be seen that I have provided a novel thermostat structure and a novel method of making a thermostat in which any required degree of compensation can be produced depending upon the degree of restraint applied to the strip and upon the location of the restraint with respect to the main body of the strip, and that the thermostat may be either slow or snap-acting. When the thermostat is snap-acting, the necessary resilience may be incorporated directly into the metal of the strip.

Wherever in the specification and claims reference is made to angular movement of a portion of the strip, I mean a movement of a portion of the strip, as distinguished from the strip as a whole, from one plane to a plane out of parallelism with the first plane.

To distinguish from various reversed or twisted thermostatic strips and from "hairpin" and reentrant or ring shapes of thermostats, I have used in some of the claims the terms "substantially straight," "non-reversed," and "non-reentrant." By this definition I mean a thermostatic strip which although it may contain local points of curvature, nevertheless possesses the following characteristics: If such a strip be fixed in space at one end, while the other end remains totally unrestrained, a rise in temperature of any and all portions of the strip will result in a movement of the free end in only one direction along a line of movement substantially at right angles to the plane of the strip at a portion adjacent to its fixed end.

The term "reactive couple" as used herein, means that couple which will react against any tendency of an identified portion of the strip to move angularly. For example, in the form shown in Figs. 3-4, it is the couple which is applied by the support 18—19 and transmitted to the portion of the thermostatic strip in contact with the button 27 and reacting against any tendency of this portion, or the portion 101, to move angularly. Similarly, in the form Figs. 7-8, it is the top retaining member held by the headed screw 48 and the support 39 acting in conjunction with the portion 103 of the strip which serves to react against any tendency toward angular motion of the portion which contacts the button 21. Again, in the form shown in Figs. 11–12, it is the spring 26 acting in conjunction with the pin 56 which applies the reactive couple. This will be better understood by references to Figs. 24, 25, and 26, showing diagrammatically the presence of this reactive couple in the illustrative forms. For purpose of illustration it is assumed that the high expansion side of the thermostat strip is on top and heat is so applied to this strip as to cause the right end of the strip, if free and unrestrained, to move through the angle a (exaggerated) to the dotted line position, Fig. 24. It should now be clear that if a support of the type shown is placed at this end of the thermostat strip and on opposite sides thereof, as shown in Fig. 24, then such support will react against any such tendency of the thermostatic strip to so move angularly, with a couple of the value PI and in the direction of rotation shown in Fig. 24. Here, PI is the moment of the couple. Actually, the forces PP constituting the couple will be distributed in varying degree over the full area of the faces of the two supporting blocks 18—19. However, for sake of simplicity, I have indicated merely the resultant of these distributed forces by PP. From the foregoing, it will be apparent that similar reactive couples PI are present in each of the Figures 25 and 26. Referring more particularly to Figs. 3 and 4, the support 18—19 applies the angular restraint discussed above in connection with Fig. 24. However, in this particular application illustrated in Figs. 3 and 4, the degree of such restraint is considerably reduced as far as its action on the portion 101 or the portion adjacent to the button 21 is concerned. This is brought about by the very elastic shape of the portion 33 (Fig. 1) which in this instance is formed from the thermostat strip although it might be of other material. This portion 33 serves to elastically transmit in any predetermined degree to the portion 101 of the strip, the angular restraint originally imposed by the support 18—19. This same principle applies in the case of Fig. 11, except that in this case the extreme right end of the strip is totally restrained against angular motion but is under only slight restraint to vertical motion. However, just as in the previous case, this angular restraint originally applied at 57 of Fig. 9, is elastically transmitted by the portion 62 to the portion 102 to obtain only the degree of compensating action desired.

It will be observed that in Fig. 1 the portion 32 will be that part of the thermostat which performs the main thermostatic action or control action tending to maintain constant the temperature of the surface to which this end is mounted, and portion 101 that part which performs the secondary or compensating effect due to its greater response to the temperature of the ambient atmosphere.

It will also be observed that by predetermined shaping of the thermostatic strip, or by predetermined shaping of elastic means external to the strip, to provide a greater or lesser degree of angular "softness" or elastic resiliency, I am able to positively and definitely balance the degree of compensation according to the particular need and thus provide a very practical and dependable control device. Also, as a result of the longitudinal "softness" of this portion 33, I obtain a more dependable snap-acting operation when the strip is subject to longitudinal compressive stress, as shown in Fig. 3. This is particularly advantageous because this snap-acting operation occurs without frictional resistance which is normally encountered in conventional prior art structures embodying snap action.

In using the term "uncontrolled medium" reference is made to the temperature of a medium, which temperature, although it may to some degree be dependent on the temperature of the medium to be controlled is, nevertheless, not a definite and complete function thereof, but is also dependent in some degree upon other varying factors incidental to uses of the device to which the thermostat is applied, and which factors are of sufficient magnitude to require compensation for their effect on that portion of the thermostat which is mainly responsive to a medium whose temperature is to be indicated or controlled.

While I have described and illustrated specific embodiments of the invention, this has been by way of illustration and not limitation, and I do not wish to be limited except as required by the prior art and the appended claims, in which—

1. A thermostat comprising a blade consisting at least in part of a substantially straight strip of thermostatic metal which, when free, is adapted to warp in one direction throughout its entire length in response to a change in temperature in one sense, means for confining said blade at one point against lateral and angular movement, means for applying a reactive couple to said strip including means for elastically restraining a portion of said strip against angular movement at a point spaced lengthwise from said first mentioned point to effect temperature responsive forces in the strip in the opposite direction from the first-mentioned direction according to the degree of said restraint, means for compressively stressing said strip longitudinally thereof to produce snap action with change of temperature, and means responsive to lateral movement of said strip at the second-mentioned point for actuating a controllable device.

2. A thermostatic device for indicating or controlling the temperature of a primary medium and for compensating for the effect of variations in temperature of an uncontrolled second medium, consisting of a non-reversed, non-reentrant, substantially straight strip of thermostatic material, one portion of the strip being mainly responsive to the temperature of said primary medium and another portion spaced lengthwise from the first mentioned portion being mainly responsive to the temperature of said uncontrolled medium, means restraining one of said portions against lateral and angular motion, and means for applying a reactive couple to the other portion of the strip to restrain angular motion of said other portion but permitting minimum restraint to motion of said other portion in a line of action normal to the length of the strip, said reactive couple acting to produce a thermal response at said other portion and in said line of action in one direction upon a rise in temperature of said primary medium and a thermal response in said line of action in the opposite direction upon a rise in temperature of said uncontrolled medium, the effective section modulus of the strip being varied to obtain a controlled degree of compensating action.

3. A thermostat comprising a blade consisting at least in part of a substantially straight strip of thermostatic metal which, when free, is adapted to warp in one direction throughout its entire length in response to a change in temperature in one sense, means for confining said blade at one point against lateral and angular movement, means for applying a reactive couple to said strip including means for elastically restraining a portion of said strip against angular movement at a point spaced lengthwise from said first mentioned point to effect temperature responsive forces in the strip in the opposite direction from the first mentioned direction according to the degree of said restraint, the effective section modulus of the strip being varied to provide one end portion of greater flexibility than the portion adjacent to the other end, and means responsive to lateral movement of said strip at the second mentioned point for actuating a temperature indicating or controlling device.

4. The combination in a thermostat of a strip of thermostatic metal adapted to warp in the same direction throughout its entire length when free to respond to a change in temperature, in one sense, for producing a main thermostatic movement in a direction transverse to the length of the strip, flexible means integral with the strip body acting on a portion of said strip for imparting elastic restraint to angular movement thereof to produce in said strip a secondary force in a direction opposite from the first-mentioned direction to modify the main thermostatic movement proportional to the degree of said restraint and the differences in temperature existing throughout the length of said strip, means for supporting said strip with a part thereof remote from said portion and in good thermal relation to a medium to be temperature controlled, spring means extraneous to and acting on said strip, and means for adjusting the pressure of said spring means to vary the temperature at which said thermostat moves to a predetermined position.

5. The combination in a thermostat of a strip of thermostatic metal adapted to warp in the same direction throughout its entire length when free to respond to a change in temperature, in one sense, for producing a main thermostatic movement in a direction transverse to the length of the strip, flexible means integral with the strip body acting on a portion of said strip for imparting elastic restraint to angular movement thereof to produce in said strip a secondary force in a direction opposite from the first mentioned direction to modify the main thermostatic movement proportional to the degree of said restraint and the differences in temperature existing throughout the length of said strip, means for supporting said strip with a part thereof remote from said portion and in good thermal relation to a medium to be temperature controlled, said flexible restraint including spring means extraneous to and acting on said strip and a pin rigidly connecting said spring means and said strip to restrain angular movement of a portion of said strip.

6. The combination in a thermostat of a strip of thermostatic metal adapted to warp in the same direction throughout its entire length when free to respond to a change in temperature, in one sense, for producing a main thermostatic movement in a direction transverse to the length of the strip, flexible means integral with the strip body and deriving its flexibility from reduction in the effective section modulus of the strip, said means acting on a portion of said strip for imparting elastic restraint to angular movement thereof to produce in said strip a secondary force in a direction opposite from the first mentioned direction to modify the main thermostatic movement proportional to the degree of said restraint and the differences in temperature existing throughout the length of said strip, and means for supporting said strip with a part thereof remote from said portion and in good thermal relation to a medium to be temperature controlled, said portion being mainly responsive to the temperature of an uncontrolled medium.

7. The combination in a thermostat of a strip of thermostatic metal having end portions, an intermediate portion of decreasing graduated rigidity extending from one end portion toward the other end portion, and a portion of high flexibility connecting the part of said intermediate portion of lowest rigidity to said other end portion, means for fixedly attaching said one end portion to a medium to be temperature controlled, and means for preventing substantial angular movement of said other end portion with change in temperature of said strip to impart restraint to angular movement to the part of said intermediate portion of lowest rigidity.

8. The combination in a thermostat of a strip of thermostatic metal having end portions, an intermediate portion of decreasing graduated rigidity extending from one end portion toward the other end portion, and a portion of high flexibility in the form of a relatively long serpentine curve disposed in the plane of the strip and connecting the part of said intermediate portion of lowest rigidity to said other end portion, means for fixedly attaching said one end portion to an object to be temperature controlled, means for preventing lateral and angular movement of said other end portion, and means acting on one end portion to longitudinally stress said strip to cause said strip to snap between heated and cooled positions intermediate the ends thereof.

9. The combination in a thermostat of a strip of thermostatic metal having end portions, an intermediate portion of decreasing graduated rigidity extending from one end portion to the region of the other end portion, and a portion of high flexibility in the form of a serpentine curve wherein portions of said strip are cut away at spaced intervals along the edge of said strip connecting the part of said intermediate portion of lowest rigidity to said other end portion, means for fixedly attaching said one end portion to a body to be temperature controlled, and means laterally movable in response to warpage of said strip for preventing angular movement of said other end portion to cause the part of said intermediate portion of lowest rigidity to exercise a temperature compensation effect opposite to the thermostatic movement of the main body of said intermediate portion proportional to the difference in temperature therebetween.

10. The combination in a thermostat of a strip of thermostatic metal of substantially uniform thickness throughout its length, having one end portion adapted for attachment to a body to be temperature controlled, the strip tapering inwardly from said one end portion to a point adjacent the center of said strip, the remainder of said strip to a point adjacent the opposite end thereof having a serpentine configuration in the plane of the strip formed by cutting notches alternately in the side edges of said strip to provide longitudinal and lateral flexibility through torsional movement of the components thereof, whereby the central portion of said strip will move with a temperature compensated snap action when the strip is stressed longitudinally and the ends are held against lateral and angular movement.

11. The combination in a thermostat of a strip of thermostatic metal of substantially uniform thickness having end portions adapted to be fixedly supported, a central portion tapering inwardly from its mid point toward said end portions, and portions of high flexibility connecting the ends of said central portion to said end portions, said portions of high flexibility being in the form of serpentine curves formed by cutting notches alternately in opposite edges of said blade to impart flexibility thereto through torsional movement of the components thereof to produce temperature compensated snap action at the center of said strip when the same is stressed longitudinally and the ends are held against movement.

12. The combination in a thermostat of a strip of thermostatic metal of substantially uniform thickness, said strip tapering inwardly from one end toward the other end thereof and terminating in a serpentine curve formed by cutting notches in opposite sides of said blade to give flexibility thereto through torsional movement of the components thereof, means for fixedly supporting the first-mentioned end of said strip, a pin rigidly attached to said other end of said strip, a strip of spring metal disposed in parallelism with said thermostatic strip and rigidly connected to said pin to essentially restrain angular movement of said pin and said other end of said strip with temperature responsive warpage of said thermostatic strip to cause said thermostatic strip to be responsive to difference in temperature between the ends thereof.

13. The combination recited in claim 12, wherein means are provided for adjusting the spring strip to apply lateral pressure to said thermostatic strip and adjust the operating temperature thereof.

14. A thermostat adapted to indicate or control the temperature of a primary medium and further adapted to compensate for the effect of temperature change of an uncontrolled medium, comprising a blade consisting at least in part of a strip of thermostatic metal which, when free, is adapted to warp in one direction throughout its entire length in response to a change in temperature in one sense, means for confining said blade at one point against lateral and angular movement, means for applying a reactive couple to said strip including means varying the effective section modulus of the strip for elastically restraining a portion of said strip against angular movement at a point spaced lengthwise from said first-mentioned point to effect temperature responsive forces in the strip in the opposite direction from the first-mentioned direction according to the degree of said restraint, and means responsive to lateral movement of said strip at the second-mentioned point for actuating the temperature indicating or controlling device, one of said points being mainly responsive to the temperature of said primary medium and the other said point being mainly responsive to the temperature of said uncontrolled medium.

15. A thermostatic device for indicating or controlling the temperature of a primary medium and for compensating for the effect of variations in temperature of an uncontrolled second medium, consisting of a non-reversed, non-reentrant, substantially straight strip of thermostatic material, one portion of the strip being mainly responsive to the temperature of said primary medium and another portion spaced lengthwise from the first mentioned portion being mainly responsive to the temperature of said uncontrolled medium, means restraining one of said portions against lateral and angular motion, and means for applying a reactive couple to the other portion of the strip to restrain angular motion of said other portion but permitting minimum restraint to motion of said other portion in a line of action normal to the length of the strip, said reactive couple acting to produce a thermal response at said other portion and in said line of action in one direction upon a rise in temperature of said primary medium and a thermal response in said line of action in the opposite direction upon a rise in temperature of said uncontrolled medium.

16. A thermostat comprising a non-reversed, non-reentrant, substantially straight strip of thermostatic metal which when free is adapted to warp in the same direction throughout its entire length in response to a change in temperature in one sense, means for confining said strip at a first portion against lateral and angular movement, and means for applying restraint to angular motion of a second portion of the strip spaced lengthwise from said first portion whereby to apply a reactive couple to said second portion to cause action of a point in said second portion in one direction in a line of action transverse to the major axis of the strip at said point in response to rise in temperature of the first-mentioned portion and action in the opposite direction in said line of action in response to rise in temperature of said second portion, said restraint applying means including flexible means providing a predetermined degree of restraint to angular motion of said second portion to accurately compensate for lag in temperature between the first-mentioned portion and the second-mentioned portion when the thermostat is applied to control the temperature of a device to the temperature of which one of said portions is mainly responsive.

17. A thermostat as set forth in claim 16, including means for stressing the strip under longitudinal compression to obtain snap acting movement in a direction normal to its length.

18. A compensating thermostat consisting of a non-reversed, non-reentrant, substantially straight thermostatic strip, means supporting one portion of the strip against both angular motion and motion in a direction normal to its length, means subjecting a second portion of the strip longitudinally spaced from the first mentioned portion to a reactive couple acting to restrain angular motion of the second portion but offering minimum restraint to said second portion in a direction normal to the length of the strip for the purpose of producing an effective thermostatic action at said second portion in the line of said direction in one way or the opposite depending on whether said second portion or that portion of the strip immediately adjacent to the first portion is heated, one said heated portion being mainly responsive to the temperature of a primary medium and thereby producing a primary thermostatic effect in said one direction and the other heated portion being mainly responsive to the temperature of an uncontrolled second medium and thereby producing a secondary or compensating effect in the opposite direction to compensate for the effect of any variations in temperature of said uncontrolled medium, the net effective thermostatic action being the vector sum of said primary and secondary thermostatic effects, and means coacting with the strip to utilize said net effective thermostatic action for a temperature indicating or controlling function.

19. A compensating thermostat as set forth in claim 18, in which the effective section modulus of the strip is varied to obtain a predetermined degree of angular restraining action imposed through said reactive couple means, whereby to obtain a predetermined ratio of the magnitude of the primary thermostatic effect to the magnitude of the secondary thermostatic effect.

20. A compensating thermostat as set forth in claim 18, including means providing a predetermined reduction in degree of angular restraining action imposed through said reactive couple means, whereby to obtain a predetermined ratio of the magnitude of the primary thermostatic effect to the magnitude of the secondary thermostatic effect.

21. A compensating thermostat as set forth in claim 18, including means external to the strip providing a predetermined degree of angular restraining action to said second portion, whereby to obtain a predetermined ratio of the magnitude of the primary thermostatic effect to the magnitude of the secondary thermostatic effect.

22. A compensating thermostat as set forth in claim 18, in which the first mentioned portion is an end portion and the second portion constitutes the end of the strip opposite from said end portion.

23. A compensating thermostat as set forth in claim 18, in which the first mentioned portion is an end portion and the second portion constitutes the end of the strip opposite from said end portion, and in which the effective section modulus of the strip is varied along its length to provide a predetermined degree of said angular restraint.

24. A compensating thermostat as set forth in claim 18, in which the first mentioned portion is an end portion and the second portion constitutes the end of the strip opposite from said end portion, and in which the reactive couple is applied to the second portion by non-thermostatic means extraneous to the strip.

25. A compensating thermostat comprising a strip of thermostatic material, means supporting a first portion of the strip against both angular and lateral motion, means subjecting a second portion of the strip spaced longitudinally from the first portion to a reactive couple acting to restrain angular motion of said second portion, and means providing a predetermined reduction in degree of angular restraining action imposed through said reactive couple means, whereby to obtain a controlled degree of softening to said restraint, the section modulus of the strip being varied by a longitudinally tapering portion of the strip so that the section modulus gradually narrows toward the second portion, and the narrow end of said tapered portion being joined to said second portion by a portion having serpentine configuration lengthwise of the strip.

26. A compensating thermostat comprising a strip of thermostatic material, means supporting a first portion of the strip against both angular and lateral motion, means subjecting a second portion of the strip spaced longitudinally from the first portion to a reactive couple acting to restrain angular motion of said second portion, and means providing a predetermined reduction in degree of angular restraining action imposed through said reactive couple means, whereby to obtain a controlled degree of softening to said restraint, the second portion being free to move in a direction normal to the length of the strip by flexing of the strip, the reactive couple being applied by means including a resilient non-thermostatic member arranged in substantially parallel relation to the strip, the resilient member being mounted at one end so that by flexing of said member its opposite end is free to move in the direction of said movement of the second portion of the strip, and means connecting said free end of the member to said second portion of the strip for applying said reactive couple.

27. A compensating thermostat having means for producing a main thermostatic action in one direction in response to a temperature rise of a primary medium and a thermostatic action in the opposite direction in response to a temperature rise of an uncontrolled second medium resulting in a net effective thermostatic action which is the vector sum of said main and secondary thermostatic actions, said means consisting of a non-reversed, non-reentrant strip of thermostatic material, a support for so mounting a first portion of said strip as to restrain said portion against angular and lateral motion, means for applying a couple acting to restrain angular motion of a second portion of said strip while permitting minimum restraint to lateral motion of said second portion in a line of action normal to the general length of said strip, and means utilizing the resultant thermostatic action in said line of action for indicating or controlling the temperature of said primary medium, one of said portions of the strip being mainly responsive to the temperature of said primary medium and said other portion of the strip being mainly responsive to the temperature of said second medium.

28. A thermostat comprising a substantially straight strip of thermostatic material, means fixing one end portion of the strip against a heat conducting surface of a member the temperature of which is to be controlled, means confining the opposite end portion of the strip against angular and lateral motion, the strip diminishing in width from adjacent the fixed end to a point medially between the ends whereby to provide a portion of decreasing graduated rigidity, that portion of the strip between the opposite confined end and the portion of decreasing rigidity being cut away at spaced intervals along its opposite edges to provide a serpentine portion of high flexibility, said portion of decreasing graduated rigidity being primarily responsive by conduction to the temperature of said member and responding in a primary thermostatic action in one direction normal to the length of the strip, the medial portion being primarily responsive to the ambient temperature and responding in a compensating thermostatic action opposite in direction from that of said primary thermostatic action, the thermostat responding in a net effective thermostatic action which is the vector sum of said primary and compensating thermostatic actions and thus in the direction of that thermostatic action which predominates.

29. A thermostat comprising a substantially straight strip of thermostatic material, means supporting each opposite end of the strip against lateral and angular motion, the central portion of the strip diminishing in width toward each end of the strip to provide a central portion of decreasing graduated rigidity at each end thereof, that portion of the strip between each supported end and the adjacent portion of diminishing rigidity being cut away along its opposite edges to provide a serpentine portion of high flexibility, said central portion being primarily responsive to the surrounding medium and thereby responding in a thermostatic action in one direction normal to the length of the strip, the supported end portions being primarily responsive to the temperature of the medium to which said ends are supported and thereby responding in a thermostatic action opposite in direction from that of the first described thermostatic action, the thermostat responding in a net effective thermostatic action which is the vector sum of the first and second described thermostatic actions and thus in the direction of that described thermostatic action which predominates.

30. A thermostat comprising a substantially straight strip of thermostatic material, means fixing one end portion of the strip against a supporting member, a strip of resilient material substantially parallel and in laterally offset relation to the thermostatic strip, said resilient strip being mounted at one end adjacent to the support of the thermostatic strip, the end of each strip opposite from its support being free to move laterally in a plane normal to the length of the respective strip, means connecting the free end of the resilient strip to the free end of the thermostatic strip in such manner as to subject said free end portion of the thermostatic strip to a reactive couple which functions to restrain angular motion of the free end portion of the thermostatic strip, the thermostatic strip diminishing in width from adjacent its supported end toward its free end whereby to provide a portion of decreasing graduated rigidity, that portion of the thermostatic strip between its free end and the adjacent portion of diminishing rigidity being cut away along its opposite edges to provide a serpentine portion of high flexibility, said portion of diminishing flexibility being responsive to the temperature of the supporting member and responding in one direction normal to the length of the strip, the narrow portion of said portion of diminishing rigidity being responsive to the surrounding medium and responding in the opposite direction normal to the length of the strip, the serpentine portion serving to soften the restraint to said angular motion, the thermostat responding in a net effective thermostatic action which is the vector sum of the described opposite thermostatic actions and thus in the direction of that thermostatic action which predominates.

LUDVIK J. KOCI.